United States Patent [19]

Placek, deceased

[11] Patent Number: 4,569,865

[45] Date of Patent: Feb. 11, 1986

[54] BUMPER FASCIA AND PROCESS TO BOND IONOMERS TO METAL

[75] Inventor: Vladimir Placek, deceased, late of Oakville, Canada, by Anna Placek, executrix

[73] Assignee: Susan Shoe Industries Limited, Ontario, Canada

[21] Appl. No.: 592,548

[22] Filed: Mar. 23, 1984

[51] Int. Cl.⁴ ............................................. B60R 19/02
[52] U.S. Cl. .................................. 428/31; 264/328.1; 293/109; 428/461
[58] Field of Search ............... 428/31, 461; 264/328.1; 293/109

[56] References Cited

U.S. PATENT DOCUMENTS

| | | | |
|---|---|---|---|
| 3,264,272 | 8/1966 | Rees | 428/910 X |
| 3,745,056 | 7/1973 | Jackson | 428/31 X |
| 3,765,928 | 10/1973 | Smarook | 427/373 |
| 3,843,182 | 10/1974 | Walls et al. | 293/122 |
| 3,866,963 | 2/1975 | Weller | 293/109 |
| 3,879,238 | 4/1975 | Bierman et al. | 156/327 |
| 3,897,095 | 7/1975 | Glance et al. | 293/120 |
| 3,937,508 | 2/1976 | Glance et al. | 293/126 |
| 3,938,841 | 2/1976 | Glance et al. | 293/120 |
| 3,997,207 | 12/1976 | Norlin | 293/110 |
| 4,029,350 | 6/1977 | Goupy et al. | 293/110 |
| 4,035,436 | 7/1977 | Matsubara et al. | 428/416 X |
| 4,078,837 | 3/1978 | Auth | 293/109 |
| 4,106,804 | 8/1978 | Scrivo | 293/109 |
| 4,154,469 | 5/1979 | Goupy et al. | 293/120 |
| 4,186,915 | 2/1980 | Zeller et al. | 293/122 X |
| 4,277,526 | 7/1981 | Jackson | 428/31 |
| 4,328,986 | 5/1982 | Weller et al. | 293/120 |
| 4,354,700 | 10/1982 | Goupy et al. | 293/132 |
| 4,371,583 | 2/1983 | Nelson | 428/358 |
| 4,438,162 | 3/1984 | Nelson | 428/358 X |

*Primary Examiner*—Henry F. Epstein
*Attorney, Agent, or Firm*—Murray, Whisenhunt & Ferguson

[57] ABSTRACT

A construction is disclosed for a component for an automotive bumper selected from the group consisting of an automotive bumper, a bumper fascia and a bumper guard, said construction comprising a laminate construction of a thin substantially rigid metal outer shell supported by a substantially rigid, resiliently deformable plastic backing bonded to said shell over substantially the entirety of an inner surface of the shell. The plastic backing comprises a thin intermediate layer of ethylene acrylic acid co-polymers and a backing layer of Surlyn ionomers. Also disclosed is a process for bonding Surlyn ionomers to stainless steel through use of said intermediate layer.

20 Claims, 9 Drawing Figures

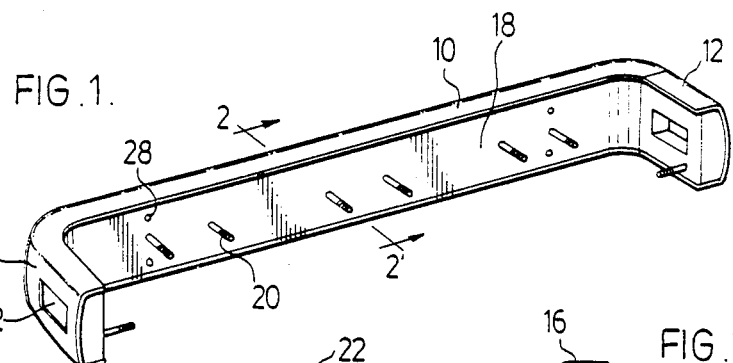
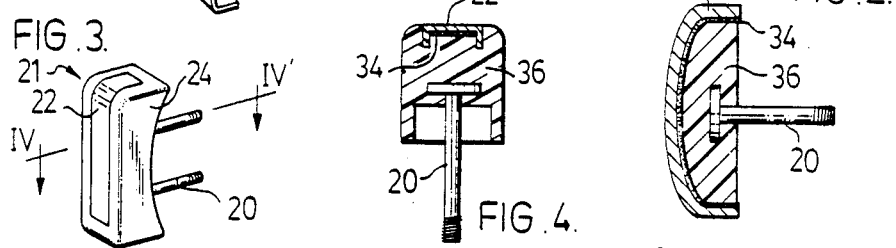
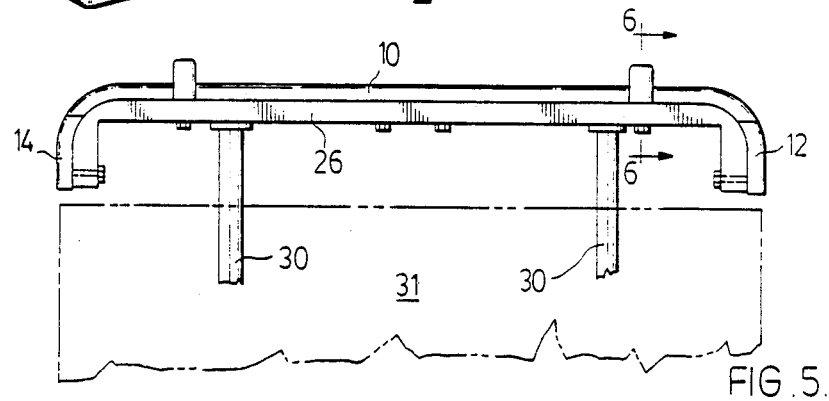
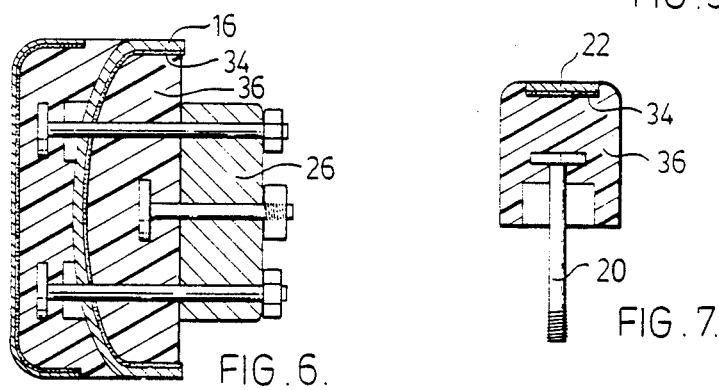

BUMPER FASCIA AND PROCESS TO BOND IONOMERS TO METAL

BACKGROUND OF THE INVENTION

This invention relates to a novel composite structure for an automotive bumper, bumper fascia or bumper guard and more particularly to bumper fascia and bumper guards with thin stainless steel shells supported by and bonded directly to a substantially rigid, resiliently deformable plastic backing.

Further, the invention relates to a novel process for bonding ionomers such as Surlyn (Trade Mark of Dupont Company) to metals such as stainless steel and aluminum.

Automotive bumpers and bumper guards made entirely from metal are well known. These metal bumpers and bumper guards suffer the disadvantage of being excessively heavy, particularly where they are to have a sufficient thickness to reasonably resist permanent deformation on scratching or impact. Recently to reduce weight, many metal bumpers and bumper guards have been replaced by plastic or fiberglass bumpers and bumper guards. From a decorative point of view, however, bumpers and bumper guards are desired to have a chromed metallic appearance. To this end, many plastic bumpers and bumper guards have been provided with decorative inserts appearing as metal strips. Such strips may comprise an extremely thin metal foil covered by a transparent plastic protective layer. These known metal foil strips suffer the disadvantage that the appearance of the foil is easily marred by minor scratches and collisions. Presently known bumpers, bumper fascia and bumper guards suffer the disadvantages of failing to provide a practical product with a decorative yet functional metal outer surface at an acceptable cost and weight.

Accordingly, it is an object to at least partially overcome these disadvantages by providing a novel composite construction for bumpers, bumper fascia and bumper guards comprising a thin metallic skin-like layer supported by and bonded to a plastic backing.

In one of its aspects the present invention provides a construction for a component for an automotive bumper selected from the group consisting of an automotive bumper, a bumper fascia and a bumper guard, the construction comprising a laminate construction of a thin substantially rigid metal outer shell supported by a substantially rigid, resiliently deformable plastic backing bonded to the shell over substantially the entirety of an inner surface of the shell.

In the past attempts to secure plastic compounds to metals have not proven satisfactory, particularly, in respect of the process steps required for bonding, the cost and the nature of the plastic material and adhesive agents used and the strength of the bonds obtained. In particular, processes to secure zinc or sodium based ethylene ionomers such as Surlyn to stainless steel have suffered disadvantages in regard to providing satisfactorily strong bonds as are necessary in automotive bumper applications as well as in regard to providing practical implementation of such bonding processes at reasonable cost. For example processes involving the use of cylene primers for bonding of olefin polymers to metals have not proved satisfactory with ionomers. Such cylene primers require pre-heating to substantially high temperatures to provide activation energies necessary for useful bonding to Surlyn ionomers.

Accordingly it is a further object of the present invention to at least partially overcome these disadvantages by providing a novel process to bond ionomers such as zinc or sodium based ethylene ionomers preferably Surlyn to stainless steel through an intermediate layer of a co-polymer of polyethylene and an acrylic acid, preferably an ethylene acrylic acid co-polymer.

In another of its aspects the present invention provides a process to bond ionomers to metal comprising the steps of:

(1) bonding a thin intermediate layer of copolymer of polyethylene and an acrylic acid to the surface of the metal, and (2) injection moulding onto said intermediate layer said ionomers, wherein said co-polymers being sufficiently compatible with acid end groups of said ionomers to bond therewith. Preferably the process is carried out with zinc or sodium based ethylene ionomers and with co-polymers of polyethylene and an acrylic acid such as ethylene acrylic acid co-polymer and methacrylic acid co-polymer. The co-polymers preferably are selected to be similar to and compatible with acid end groups found in the ionomers to form strong bonds therewith.

SUMMARY OF THE INVENTION

In accordance with a preferred aspect of the present invention, a novel bumper fascia is provided preferably comprising a stainless steel shell supported with injection applied, foamed ionomer resin. All fastening and hinging devices for mounting the fascia to a vehicle are integrally mounted in the supportive plastic backing ensuring a light weight, rigid, highly functional product with excellent appearance characteristics and impact performance.

The plastic backing may be bonded to the preferred stainless steel shell by the following preferred process in accordance with the present invention described with specific reference to the manufacture of a novel bumper fascia. The stainless steel metal shell is preferably manufactured from 0.030 inch, 301 stainless steel which is machined as by roll forming, stamping, and punching to the desired shapes. Preferably the shell is plated by immersion in chromic acid and then buffed.

After ensuring the inner surface of the steel shell is clean and grease free, a first intermediate primer layer of the plastic backing is applied. Preferably, a dispersion of ethylene acrylic acid co-polymers in a suitable solvent is sprayed onto the inner surface of the steel shell and then allowed to air dry with heating for example at 130° F. Suitable ethylene acrylic acids co-polymers are chosen which form secure bonds with the metal oxides in the surface of the stainless steel shell. Preferably sufficient of the ethylene acrylic acid co-polymer dispersion is applied to provide a thin continuous intermediate layer over the entirety of the inner surface of the steel shell.

Once the ethylene acrylic acid co-polymer has dried on the steel shell, the steel shell is placed in a suitable injection mould to permit a second backing layer of the plastic backing to be injection moulded onto the exposed surface of the intermediate layer. Preferably the backing layer core comprises substantially zinc and sodium based ethylene ionomers together with conventional additives and foaming agents to reach densities, for example, in the range of 0.85 g/cm$^3$ after injection.

Prior to injection moulding, the steel shell which has been coated with the intermediate layer is preferably warmed in a low heat oven. This reduces the amount of heat required from the moulded plastic to be injected to activate bond formation between the injected plastic and the intermediate layer of ethylene acrylic acid co-polymer. Preferred warming is to 90° to 130° F.

Preferred zinc and sodium base ionomers comprise zinc and sodium base ethylene ionomers such as sold under the Surlyn trade mark by Dupont Company. The co-polymer of the intermediate layer is to be chosen having regard to the nature of the ionomer to be injection moulded. Preferably, the co-polymers should comprise ethylene acrylic acid co-polymers similar to and compatible with the acid end groups found in the ionomers. One preferred co-polymer dispersion for use with Surlyn ionomers is EAA dispersion No. 483 marketed by Dow Chemical Company Limited.

While the mechanism whereby the intermediate co-polymer layer bonds with the injected ionomer is not fully understood, it is believed to include partial polymerization between organic end groups of the co-polymers and end groups of the ionomers, as well as the inter-molecular forces formed between long chained olefin polymers.

Preferably fastening devices to mount the bumper fascia to a bumper may be bolts having knurled necks imbedded in the injected plastic backing layer and pre-coated with a phosphate electro organic coating to reduce corrosion.

BRIEF DESCRIPTION OF THE DRAWINGS

Further objects and advantages of the invention will appear from the following description taken together with the accompanying drawings in which:

FIG. 1 is a pictorial view of three portions of bumper fascia in accordance with a preferred embodiment of the present invention, FIG. 2 comprises a cross-sectional through the bumper fascia of FIG. 1 along section line I-I'.

FIG. 3 shows a pictorial view of a bumper guard in accordance with a preferred embodiment of this invention.

FIG. 4 is a cross-sectional view through the bumper guard of FIG. 3 along section line III-III'.

FIG. 5 comprises a schematic top elevation view of a bumper fascia of FIG. 1 and a bumper guard of FIG. 2 as included in an assembled bumper coupled to one end of an automobile frame.

FIG. 6 comprises a cross-sectional view through the assembled bumper of FIG. 5 along V-V'.

FIG. 7 comprises a cross-sectional view similar to that of FIG. 4 through a bumper guard similar in many respects to the bumper guard of FIG. 3.

DETAILED DESCRIPTION OF THE DRAWINGS

Figure 8:
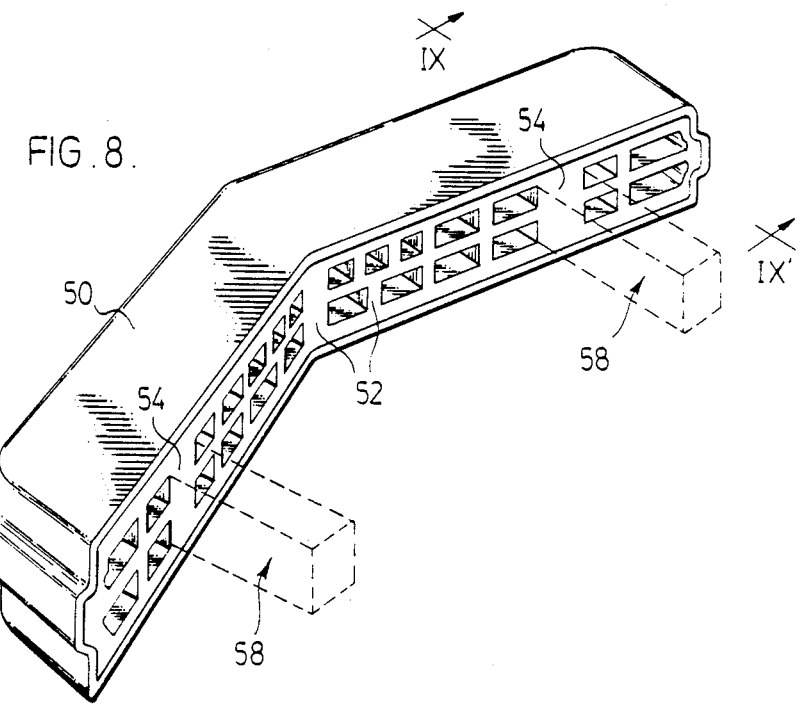
FIG. 8 comprises a pictorial view of an automotive bumper in accordance with a preferred embodiment of the invention.

Reference is made first to FIGS. 1 and 2 which show bumper fascia in accordance with the present invention. In FIG. 1 the bumper fascia is shown as three complementary segments being center segment 10 and corner or end segments 12 and 14. Alternatively, the bumper fascia could comprise a single unitary segment. In cross-section, each bumper fascia segment is similar comprising a C-shaped metal shell or skin-like layer 16 and a plastic backing generally indicated as 18.

The plastic backing 18 is bonded directly to inside surfaces of metal layer 16. Bolts 20 are provided to fasten the bumper fascia to other portions of the bumper and bolts 20 are shown impregnated within the plastic backing.

FIGS. 3 and 4 show a bumper guard 21 in accordance with the present invention. A marginally cross-sectionally, channel-shaped metal member 22 is carried by a plastic backing generally designated 24. Securing bolts 20 are impregnated within plastic backing 24. A modified construction of a bumper guard 21 is shown in FIG. 7 wherein member 22 is a planar sheet of metal located on the entire front face of the bumper guard.

FIGS. 5 and 6 show the bumper fascia of FIG. 1 and bumper guard of FIG. 3 in an assembled bumper. Bumper plate 26 is of a material such as metal or fiberglass of sufficient strength to withstand forces on low speed collisions of an automobile. Bumper fascia sections 10, 12 and 14 are mounted via bolts 20 to bumper plate 26. Bumper guards 21 are mounted over bumper fascia 10 with bolts 20 to pass through holes 28 in the bumper fascia to permit coupling to the bumper plate 26. Bumper plate 26 is coupled to two extensions 30 by means not shown. The extensions 30 are coupled to an automotive frame 31 by conventional means (not shown) such as shock-absorbing columns to absorb forces of low speed automotive collisions. Suitable openings 32 in bumper fascia segments 12 and 14 as seen in FIG. 1 may be provided to receive side lights.

Bumper guard 21 is shown in cross-section in FIGS. 5 and 6 with hollow interior portions defined between structural ribs which reduce the amount of plastic materials required and to provide desired flexibility characteristics.

As is to be appreciated from the drawings, bumper fascia 10, 12 and 14 are provided with the entire outer surface of the metal shell 16 exposed so as to provide an advantageous visual appearance to an assembled bumper. Similarly, bumper guards 21 of FIGS. 3 and 7 have the outer surface of metal member 22 exposed to provide a pleasing visual appearance.

In accordance with the present invention the plastic backing 18 and 24 are advantageously bonded directly to the inner surface of metal layer 16 and metal member 22, respectively. By means of preferred direct bonding of the plastic backing to the metal and the advantageous selection of the relative structural properties and sizing of the metal and the plastic, a new composite product is provided with novel characteristics.

The plastic backing is provided bonded to the metal layer by the process for bonding ionomers to metals previously described in this application. With this method two plastic layers are formed, firstly a very thin intermediate layer schematically shown as 34 in the drawings and secondly a substantial wider backing layer 36. The intermediate layer 34 is bonded on one surface thereof to the surface of the metal and on the other surface thereof to backing layer 36. Preferably the plastic material of backing layer 36 comprises a zinc or sodium based ethylene ionomer such as Surlyn. The intermediate layer preferably comprises an ethylene acrylic acid co-polymer similar to and compatible with acid end groups found in the ionomer. In accordance with the previously described process of the present invention with the intermediate layer bonded to the inner surface of the metal, the backing layer may then preferably be injection moulded to bond to the intermediate layer.

The physical properties of the plastic backing contribute to providing enhanced properties of the resultant composite structure. For example, a preferred plastic material for injection as the backing layer comprises:

| 50 parts zinc base Surlyn 9520 ionomer of Dupont 32 parts sodium base Surlyn ionomer 12± 5 parts glass fiber 5 parts carbon black | compounded by A. Schulman Company as FI-147C |
|---|---|
| 0.1 part stabilizer | | plus foaming agent to provide a suitable resultant foamed density. Surlyn 9520 ionomer will meet or exceed the following physical properties and maintain dimensional stability after 4 hours at 80° C.

| Property | Test | Value |
|---|---|---|
| Tensile | ASTM D638 | 17 MPa 2,465 psi |
| Elongation | ASTM D638 | 10% minimum |
| Flexural Modulus | ASTM D790 | 280 Mpa 40,600 psi |

Even when such preferred plastic material for the plastic backing is foamed, for example, to a density of 0.85 gm/cm$^3$ in injection moulding, the resultant backing layer exhibits similar superior physical properties.

A significant advantage of the present invention resides in the superior bond strength between the metal shell and the supportive plastic backing. The bonding of the preferred intermediate layers such as formed from Dow's EAA dispersion No. 483 with stainless steel and the abovenoted exemplary plastic material may withstand tensile strengths exceeding that of the foamed plastic material. This superior bonding provides the improved physical properties of the metal shell and supporting plastic backing. With the metal shell securely bonded to the plastic backing, the flexibility of the composite bumper fascia is a combination of the flexibility of the metal shell and plastic backing. Selection of the plastic materials to be substantially rigid yet resiliently deformable together with the strong bond between the metal shell and the plastic backing provides the composite product with an ability to resist permanent deformation and indentation of the metal shell on impacts, the forces of which in the absence of the plastic backing would result in permanent deformation of the metal shell. This enables metal shells of substantially reduced thickness to be utilized decreasing weight and increasing the ability with which difficult to machine metals such as stainless steel can be used as the metal shell.

That the metal shell is merely bonded to the plastic material reduces the thickness of the metal shell suitable for use in that increased thickness of the metal is not required to distribute localized stresses arising about fastening bolts conventionally coupled to the metal.

That the metal shell is merely bonded to the plastic backing greatly enhances the decorative value of the metal shell. For example, if fastening bolts were required to be welded to a stainless steel shell, unattractive markings would occur on the external surface of the stainless steel. With the present invention a smooth, polished and buffed stainless surface can be provided.

Preferred metals for the metal shell in accordance with the present invention include stainless steel and aluminum, both being metals whose surfaces will have advantageous metal oxides to which the intermediate layer of ethylene acrylic acid co-polymers may securely bond.

Figure 9:
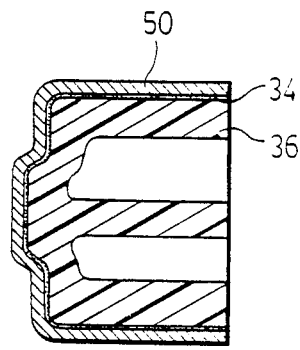
FIG. 9 comprises a cross-sectional view through the bumper of FIG. 8 along section line X-X'.

While the description of the preferred embodiment has been made specifically with respect to bumper fascia and bumper guards, it is to be appreciated that a unitary bumper fascia as for example would result from the combination of the three bumper fascia shown in FIG. 1 and structurally reinforced by additional plastic backing could in fact provide a unitary bumper comprising a stainless steel shell and a plastic backing. An example of a unitary bumper is shown in FIGS. 8 and 9. A metal shell 50 for example stamped from mild steel has an intermediate layer of co-polymers 34 bonded over the entirety of its inner surface and backing layer 36 bonded thereto. The backing layer may preferably be in the range of one half inch thickness where it overlies the intermediate layer. The backing layer preferably includes structural rib-like members 52 to increase strength yet save weight and material.

Reinforced plate-like portion 54 may provide a location for imbedding in the plastic backing, at the time of moulding, bolts (not shown) or nuts (not shown) to couple the bumper to the remainder of an automobile or alternatively reward extensions of the plastic backing shown in dotted lines as 58 may serve the equivalent of extensions 30 in FIG. 5.

A major advantage of the bumper, bumper fascia and bumper guards of the present invention is that they are substantially resistant to corrosion. In ensuring maximum corrosion resistance it is preferred, that the metal shell not be contacted by other metallic parts. For example preferably metal bolts 20 impregnated in plastic backing 36 of FIG. 2 do not contact shell 16.

The metal shells 16 of FIG. 2 and 50 of FIG. 8 are advantageously chosen to have an open-ended C-shaped or U-shaped cross-section. This facilitates injection of the backing layer into the rear of the shells. A major advantage is the use of the resiliency of the metal shell to assist in forming a viable seal when the shell in placed into the mould. The mould may preferably be designed to flex the C-shaped shell inwardly forcing each end of each arm of the C together. By having portions of the mould cavity flex these arms inwardly a minor extent, the mould will permit preferred sealing with the shell notwithstanding minor dimensional differences in the shells. The mould is chosen so that even the smallest width C-shaped shells will be inwardly flexed a small amount.

In accordance with the process of the present invention injection moulding of the plastic material composition described on page 12 of this application has advantageously been carried out with plastic melt injected at temperatures in the range of 425° to 435° F. The injection temperature of the plastic material may be suitably selected by persons skilled in the art having regard to the plastic material being injected.

FIG. 5 shows a schematic use of both a bumper fascia in accordance with this invention and a bumper guard. A preferred use of the bumper fascia having a stainless steel shell is without such bumper guards.

Dow EAA Dispersion No. 483 being a preferred co-polymer for use in accordance with this invention is described in the 1981 Dow EAA Dispersable Resin Catalogue. Such preferred co-polymers comprise polyethylene based polymers with substantially unneutralized carboxylic acid end groups having a melt index in the range of 300 to 1300. Preferably these copolymers have molecular weights in the range of 10,000 to 25,000 with molecular weights in the upper end of this range and even greater than 25,000 believed preferred to maximize inter-molecular forces between long claimed co-polymers and the ionomers.

Although this disclosure describes and illustrates preferred embodiments of the invention, it is to be understood that the invention is not limited to these particular embodiments. Many variations and modifications will now occur to those skilled in the art. For a definition of the invention reference is made to the appended claims.

What I claim is:

1. A light weight, corrosion resistant, rigid bumper for an automotive vehicle comprising:
   a thin, substantially rigid, high tensile metal outer shell having an inner and an outer surface,
   a substantially rigid but resilient foamed plastic core,
   said shell and core bonded together over substantially the entirety of the inner surface of the shell via a thin, intermediate primer layer between the shell and core,
   wherein said bumper is made by a process comprising steps of bonding the intermediate primer layer to the inner surface of the shell and then foam injection molding the core thereonto.

2. The bumper of claim 1 wherein the intermediate layer bonds the shell and core together with bonds of sufficient strength that the bonds do not fail under forces experienced in low speed collisions of automotive vehicles.

3. The bumper of claim 2 wherein the outer surface of the shell provides a decorative surface comprising substantially the entirety of outwardly disposed bumper surfaces on said bumper.

4. The bumper of claim 2 wherein said shell comprises stainless steel of approximately 0.03 inch thickness or greater and said bumper resists permanent deformation when subjected to impacts which would cause permanent deformation of the shell alone.

5. The bumper of claim 2 wherein the intermediate layer comprises substantially unneutralized carboxylic acid copolymer of ethylene, the core comprises foamed ethylene ionomer, and the shell comprises a metal selected from steel and aluminum.

6. A bumper as claimed in claim 2 wherein said core is foam injection moulded with the shell at relatively low temperatures.

7. In an automotive vehicle, the improvement comprising:
   a light weight, corrosion and impact resistant, rigid bumper supported on a frame of the vehicle,
   the bumper including:
      a thin, substantially rigid, high tensile metal outer shell having an inner and an outer surface,
      a substantially rigid but resilient foamed plastic core,
      the shell and core bonded together over substantially the entirety of the inner surface of the shell via a thin intermediate layer between the shell and core,
   wherein the bumper is made by a process comprising steps of bonding the intermediate layer to the inner surface of the shell and then foam injection moulding the core thereonto,
   the shell and core are bonded together by the intermediate layer with bonds of sufficient strength so as to not fail in low speed collisions of the vehicle, and
   the metal shell is coupled to the vehicle by the core with the metal shell isolated from contact with other metal components of the vehicle.

8. The improvement of claim 7 wherein the shell is coupled to the vehicle solely by bonding between the shell, intermediate layer and core.

9. The improvement of claim 8 further comprising metal coupling means coupling the core to the frame and imbedded in said core during injection moulding with the metal coupling means not contacting the metal shell.

10. The improvement of claim 9 wherein the outer surface of the shell comprises substantially the entirety of bumper surfaces of the vehicle.

11. The improvement of claim 10 wherein the outer surface of the shell provides a decorative surface.

12. The improvement of claim 8 wherein the core is foam injection moulded with the shell at relatively low temperature.

13. The improvement of claim 12 wherein the intermediate layer comprises substantially unneutralized carboxylic acid copolymer of ethylene, the core comprises foamed ethylene ionomer, and the shell comprises a metal selected from steel and aluminum.

14. The improvement of claim 13 wherein said shell comprises stainless steel of approximately 0.03 inch thickness or greater.

15. A process for the manufacture of a light weight corrosion resistant, rigid automotive bumper which bumper includes:
   a thin, substantially rigid, high tensile strength metal outer shell having an inner and an outer surface,
   a substantially rigid but resilient foamed plastic core,
   said shell and core bonded together over substantially the entirety of the inner surface of the shell via a thin, intermediate primer layer between the shell and core, said process comprising:
   forming the shell with a shape which provides an inherent flexibility to assist in forming a seal with a mould,
   coating the inner surface of the shell with the intermediate primer layer to bond the intermediate layer to the shell,
   foam injection moulding the core directly to the intermediate layer with the shell carrying the intermediate layer received in a mould,
   marginally compressing the shell with the mould against the inherent flexibility of the shell during moulding to assist in forming a seal between the mould and shell to contain foamed plastic melt injected to form the core.

16. The process of claim 15 wherein the foam injection moulding is carried out with the shell at a relatively low temperature.

17. The process of claim 16 wherein the shell comprises stainless steel of approximately 0.03 inch thickness or greater.

18. The process of claim 16 wherein the shell is formed to have a substantially C-shape in cross-section, and the process includes marginally compressing the C-shape of the shell to assist in forming said seal.

19. The process of claim 15 wherein
the core comprises ethylene ionomer,
the intermediate layer comprises carboxylic acid copolymer of ethylene, and the shell comprises a metal selected from steel and aluminum,
the process including:
applying a dispersion of carboxylic acid copolymer of ethylene in a volative solvent onto the inner surface of the shell,
drying the dispersion to form the intermediate layer at a temperature not exceeding 130° F. thereby bonding the intermediate layer to the shell,
placing the shell at a temperature not exceeding 130° F. into the mould and foam injection moulding ethylene ionomer melt thereonto.

20. The process of claim 19 wherein the carboxylic acid copolymer of ethylene is substantially unneutralized and the intermediate layer bonds the shell and core together with bonds of sufficient strength that the bonds do not fail under forces experienced in low speed collisions of automotive vehicles.

* * * * *